(12) United States Patent      (10) Patent No.:     US 8,750,477 B2
Metz et al.                    (45) Date of Patent:     Jun. 10, 2014

(54) METHOD AND SYSTEM FOR AUTOMATIC ASSIGNMENT OF OUTBOUND AND INBOUND CALL IDENTITY

(75) Inventors: Brent D. Metz, New York, NY (US); Sean MacIsaac, New York, NY (US); Kevin Caffrey, New York, NY (US); Ilia Mirkin, New York, NY (US)

(73) Assignee: Felix Calls, LLC, New York, NY (US)

( * ) Notice: Subject to any disclaimer, the term of this patent is extended or adjusted under 35 U.S.C. 154(b) by 508 days.

(21) Appl. No.: 12/726,864

(22) Filed: Mar. 18, 2010

(65) Prior Publication Data

US 2011/0019808 A1    Jan. 27, 2011

Related U.S. Application Data

(60) Provisional application No. 61/227,520, filed on Jul. 22, 2009.

(51) Int. Cl.
*H04M 1/56* (2006.01)
*H04M 3/42* (2006.01)

(52) U.S. Cl.
USPC ........................... 379/142.06; 455/415

(58) Field of Classification Search
USPC ............... 379/265.01–266.1, 142.06
See application file for complete search history.

(56) References Cited

U.S. PATENT DOCUMENTS

| | | | |
|---|---|---|---|
| 6,333,980 B1 * | 12/2001 | Hollatz et al. | 379/265.12 |
| 2003/0147519 A1 * | 8/2003 | Jain et al. | 379/211.02 |
| 2006/0172750 A1 * | 8/2006 | Mizoguchi | 455/466 |
| 2007/0121894 A1 * | 5/2007 | Noble | 379/265.02 |
| 2007/0127703 A1 * | 6/2007 | Siminoff | 379/372 |
| 2010/0215161 A1 * | 8/2010 | Baccay | 379/142.04 |
| 2010/0239084 A1 * | 9/2010 | Brown et al. | 379/218.01 |
| 2011/0007888 A1 * | 1/2011 | Yoshikawa et al. | 379/210.01 |

* cited by examiner

*Primary Examiner* — Fan Tsang
*Assistant Examiner* — Solomon Bezuayehu
(74) *Attorney, Agent, or Firm* — Lowenstein Sandler LLP

(57) ABSTRACT

A system and method for automatic assignment of outbound and inbound call identity between a salesperson and a client is disclosed. For automatic assignment of outbound call identity between a salesperson and a client, a salesperson places a call to the telephone number of the client. A phone server matches a sales group to a salesperson and an entered sales group and an NPA (i.e., area code) of the client in a database. If a match is found, the phone server substitutes a replacement caller ID for actual caller ID of the salesperson. When the client answers the call, the replacement caller ID or default caller ID is displayed on client's phone. For automatic assignment of inbound call identity between a client and a salesperson, the client places a call using the replacement caller ID. The phone server searches the database for a sales group that matches the DID of the replacement caller ID. The phone server rings the telephones of salespeople that match the sales group entry in order of the most "efficient" salesperson of the group until one of the salespeople answers their phone.

12 Claims, 6 Drawing Sheets

26 ⇘

| 28 ⇘ SALES GROUP | SALESPERSON ⇘ 30 |
|---|---|
| RED | BOB JONES |
| RED | CYNTHIA BROWN |
| BLUE | JOHN SMITH |
| BLUE | PATRICIA MARTIN |
| BLUE | JAMES SPELLMAN |

| SALES GROUP (33) | NPA (34) | DID (36) |
|---|---|---|
| RED | 703 | 123-0001 |
| RED | 215 | 597-0001 |
| BLUE | 703 | 123-0002 |
| BLUE | 703 | 123-0003 |
| BLUE | 215 | 597-0002 |

FIG. 2B

| SALES GROUP (40) | NPA (43) | DID (42) | ALLOCATION (44) |
|---|---|---|---|
| RED | 703 | 123-0001 | ALLOCATED |
| BLUE | 703 | 123-0002 | ALLOCATED |
| - | 703 | 123-0003 | UNALLOCATED |
| - | 597 | 123-1000 | UNALLOCATED |

FIG. 2C

METHOD AND SYSTEM FOR AUTOMATIC ASSIGNMENT OF OUTBOUND AND INBOUND CALL IDENTITY

CROSS-REFERENCE TO RELATED APPLICATIONS

This application claims the benefit of U.S. provisional patent application No. 61/227,520 filed Jul. 22, 2009, the disclosure of which is incorporated herein by reference in its entirety.

FIELD OF THE INVENTION

The present invention relates generally to telecommunications, and more particularly, to a method and system for automatic assignment of outbound and inbound call identity between a member of a sales force and a business.

BACKGROUND OF THE INVENTION

Major portions of modern telephone systems, including the public switched telephone network (PSTN), wireless carrier networks, and voice-over-IP (VOIP) networks are now nearly completely digital (i.e., packet switched). One element common to digital telephone networks is in-band signaling, which provides many services that land line telephone, cell phone, and VOIP phone users take for granted. One such service is Caller ID.

People often use Caller ED to screen calls. A caller may want to receive calls from telephone numbers that are recognizable. For example, when a member of a sales force (hereinafter a "salesperson") interacts with a business, the identity of the salesperson becomes a large factor that controls a significant part of the ability of the salesperson to reach an important decision maker of the business (hereinafter a "client"). A non-recognizable Caller ID for a salesperson may pose a significant problem, such as may occur when the salesperson calls the client from a home phone, a business phone, a cell phone, a smartphone, etc. If the salesperson calls with a caller ID of UNKNOWN or a generic toll free number, the client may not pick up the telephone.

Accordingly, what would be desirable, but has not yet been provided, is and method and system that customizes a salesperson's identity in their associated caller ID such that a client is more likely to be reached.

SUMMARY OF THE INVENTION

The above-described problems are addressed and a technical solution is achieved in the art by providing method and system for automatic assignment of outbound and inbound call identity between a salesperson and a client. For automatic assignment of outbound call identity between a salesperson and a client, a salesperson places a call to the telephone number of the client. A phone server matches a sales group to a salesperson in a database. If no match is found, then the phone server substitutes a default caller ID for an actual caller ID of the salesperson. If a match is found, the phone server matches an entered sales group and an NPA (i.e., an area code) of the client. If no match is found, then the phone server substitutes a default caller ID for actual the caller ID of the salesperson. If a match is found, the phone server substitutes a replacement caller ID for actual the caller ID of the salesperson. The phone server inserts the replacement caller ID or default caller ID into the signaling stream of the pending telephone call. When the client answers the call, the replacement caller ID or default caller ID is displayed on the phone of the client.

For automatic assignment of inbound call identity between a client and a salesperson, the client places a call using the replacement caller ID. The phone server searches the database for a sales group that matches the DID (i.e., the ten digit telephone number) of the replacement caller ID. The phone server rings the telephones of salespeople that match the sales group entry in order of the most "efficient" to least "efficient" salesperson of the group until one of the salespeople in the group answers their phone. If no salesperson answers her phone, the phone server directs the call to a voicemail mailbox line associated with the sales group. If a salesperson answers her phone, the Caller ID of the client is displayed to the salesperson.

According to an embodiment of the present invention, the number of available DIDs corresponding to salespeople based on sales leads may grow or shrink using a global NPA/DID pool.

According to an embodiment of the present invention, a method for automatic assignment of outbound call identity between a salesperson and a client is disclosed, comprising the steps of: (a) receiving a telephone number of a client from a salesperson; (b) matching a sales group to the salesperson; (c) matching the sales group to an area code (NPA) of the client when a match is found in step (b), and (d) substituting a replacement caller ID for the actual caller ID of the salesperson when a match is found in step (c). The method may further comprise the step of substituting a default caller ID for the actual caller ID of the salesperson if a match is not found in at least one of steps (b) and (c). One of the replacement caller ID and the default caller ID may be inserted into a signaling stream of a pending telephone call. One of the replacement caller ID and the default caller ID may be sent to the phone of the client.

According to an embodiment of the present invention, the method may further comprise the steps of (e) receiving the replacement caller ID of the salesperson from the client, the replacement caller ID having a (direct inward dial number) DID; (f) searching a database for a sales group that matches the DID; (g) completing a call to a salesperson that matches a sales group that is designated as the most efficient salesperson in the sales group according to an efficiency standard; (h) repeating step (g) for telephone numbers of salespeople in the sales group in the order of most efficient to least efficient salesperson in the sales group until a salesperson answers her telephone. The call to a voicemail mailbox line associated with the sales group may be completed when no salesperson in the sales group answers her telephone. The Caller ID of the client may be sent to the salesperson that answered her telephone.

According to an embodiment of the present invention, a method for automatic assignment of inbound call identity between a client and a salesperson is disclosed, comprising the steps of: (a) receiving a replacement caller ID of a salesperson from a client, the replacement caller ID having a (direct inward dial number) DID; (b) searching a database for a sales group that matches the DID; (c) completing a call to a salesperson that matches a sales group that is the highest ranked salesperson according to a predetermined ranking standard; (d) repeating step (c) for telephone numbers of salespeople in the sales group in the order of the highest ranked salesperson to the lowest ranked salesperson in the sales group until a salesperson answers her telephone. The predetermined ranking standard may be the highest efficiency according to a predetermined efficiency standard. The predetermined efficiency standard may be based on analysis of at least one sales ratio. The least one sales ratio may be at least one of number of sales per unit time and sales revenue achieved over calls taken from the telephone system.

According to an embodiment of the present invention, the call to a voicemail mailbox line associated with the sales group may be completed when no salesperson in the sales group answers her telephone. The Caller ID of the client may be sent to the salesperson that answered her telephone. Salespeople may be divided into one or more sales groups associated with a particular product. One of growing and shrinking the number of available DIDs corresponding to salespeople may be based on sales leads per group. Growing one and shrinking the number of available DIDs may comprise one of retrieving and returning at least one DID from/to a global pool of DIDs.

BRIEF DESCRIPTION OF THE DRAWINGS

The present invention will be more readily understood from the detailed description of an exemplary embodiment presented below considered in conjunction with the attached drawings, of which:

FIG. 2A shows a first table that associates members of the sales force with sales groups, according to an embodiment of the present invention;

FIG. 2B shows a second table which maps entries for a sales group to entries for an NPA (i.e., an area code) and a MD (i.e., Direct Inward Dial, i.e., a telephone number), according to an embodiment of the present invention;

FIG. 2C shows a third table comprising a global pool of DIDs, wherein each row in the table includes an entry for a sales group, a DID, an NPA, and an allocation entry, according to an embodiment of the present invention;

It is to be understood that the attached drawings are for purposes of illustrating the concepts of the invention and may not be to scale.

DETAILED DESCRIPTION OF THE INVENTION

Figure 1:
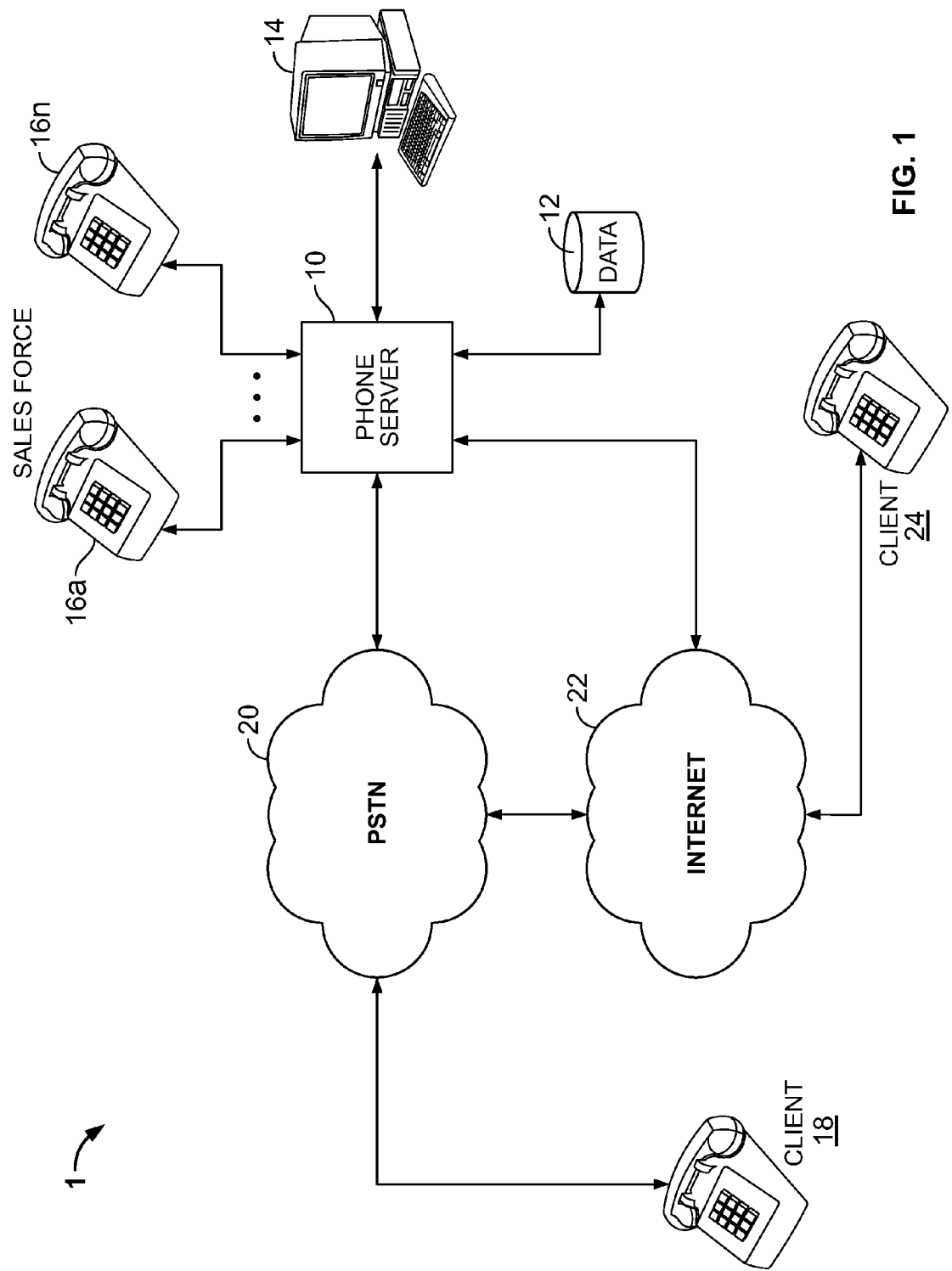
FIG. 1 depicts a system for automatic assignment of outbound and inbound call identity between a salesperson and a client, according to an embodiment of the present invention.

FIG. 1 depicts a system 1 for automatic assignment of outbound and inbound call identity between a salesperson and a client, according to an embodiment of the present invention. The system 1 includes a phone server 10, the phone server 10 being associated with a data store 12, a data entry terminal/computer 14, and a plurality of back-office telephones 16a-16n. The phone server 10 may be a traditional private branch exchange (PBX) or a voice-over-IP (VOIP) server. The phone server comprises at least one processor, which may be included in a personal computer, a work station, a mainframe computer, or any other device having enough processing power for carrying out the present invention. The data store 12 stores a number of tables for assignment of outbound and inbound call identity that are altered either automatically by the phone server 10, manually via the data entry terminal/computer 14, or a combination of both. The outbound and inbound call identity of salespeople that are associated with the one or more back-office telephones 16a-16n (hereinafter, the "salespeople 16a-16n") are stored in data store 12 and are assigned by the phone server 10 via the data store 12 to be described in connection with FIGS. 2A-2C hereinbelow.

Each of the salespeople 16a-16n may have a voice line or VOW telephone, which is configured to make outbound calls or receive inbound calls via the phone server 10. Each of the salespeople 16a-16n may communicate with a client 18 directly over the public switched telephone network (PSTN) 20 if the phone server 10 is a form of PBX, the salespeople 16a-16n have voice line phones, and the client 18 has a voice line phone; over the Internet 22 and the PSTN 20 if the phone server 10 is a VOIP server, the salespeople 16a-16n have VOIP phones, and the client 18 has a voice line phone; and, over the Internet 22 if the phone server 10 is a VOIP server, the salespeople 16a-16n have VOIP phones, and a client 24 has a VOW phone.

FIGS. 2A-2C show tables for storing and allocating caller IDs to salespeople 16a-16n, according to an embodiment of the present invention. In FIG. 2A, a first table 26 associates the salespeople 16a-16n with sales groups. There are two entries for each line of the table: a sales group entry 28 and a salesperson entry 30. Each sales group entry 28 designates a sales group ID that divides the salespeople 16a-16n into one or more teams/groups associated with a particular product (e.g., a "red team" for veterinary services, a "blue team" for automotive services, etc.). Each salesperson entry 30 contains a salesperson ID which, according to an embodiment of the present invention, may be the salesperson's name, employment ID number, actual caller ID number, etc. There may be zero or more salesperson entries 30 associated with one sales group entry 28. According to an embodiment of the present invention, the salesperson entries 30 associated with a particular sales group/team may be ordered by sales group in the first table 26 according to a predetermined ranking standard. In a preferred embodiment, the salespeople 16a-16n may be ordered from the highest ranked salesperson to the lowest ranked salesperson in the sales group according to a predetermined efficiency standard. The predetermined efficiency standard may be, but is not limited to, sales efficacy (e.g., number of sales in the last day/week/month, etc.). The ordering/ranking of entries within a sales group may be performed manually by data entry personnel at the data entry terminal/computer 14 or automatically by the phone server 10 as a result of an analysis of certain ratios (e.g., sales revenue achieved over calls taken from the telephone system).

In FIG. 2B, for each row in a second table 32, an entry for a sales group 33 is mapped to an entry for an NPA (i.e., an area code) 34 and a DID (i.e., Direct Inward Dial, i.e., a telephone number) 36.

FIG. 2C shows an optional third table 38 that comprises a global pool of DIDs, wherein each row in the table includes an entry for a sales group 40, a DID 42, an NPA 43, and an allocation entry 44 that indicates whether a DID entry 42 for a sales group 40 is available for allocation or whether the DID entry 42 has already been allocated. According to an embodiment of the present invention, the number of DIDs in the third table 38 may grow or shrink with demand for the salespeople 16a-16n.

Figure 3:
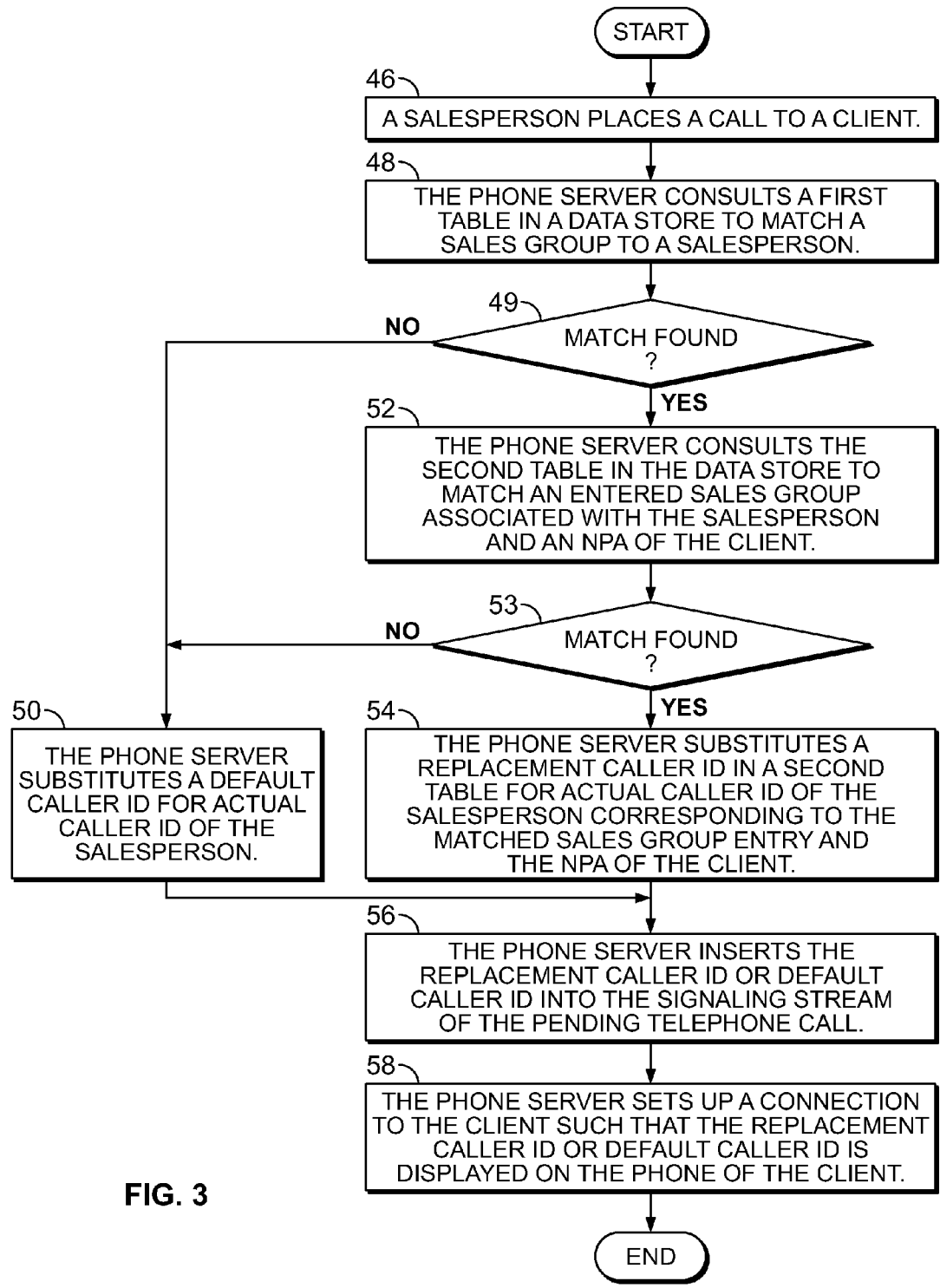
FIG. 3 is a process flow diagram illustrating exemplary steps for automatic assignment of outbound call identity between a salesperson and a client, according to an embodiment of the present invention.

FIG. 3 is a process flow diagram illustrating exemplary steps for automatic assignment of outbound call identity between a salesperson and a client, according to an embodiment of the present invention. Although FIG. 1 indicates several scenarios for interaction between the salespeople 16a-16n and one of the clients 18, 24, for illustrative purposes, the following example shows interactions in which the salespeople 16a-16n have VOIP telephones for communicating with a client 18 that has a voice line phone.

Referring now to FIGS. 1, 2A, 2B, and 3, at step 46, a salesperson 16a places a call to the telephone number of the client 18. At step 48, the phone server 10 consults the first table 26 in the data store 12 to match a sales group entry 28 to a salesperson entry 30. If, at step 49, no match is found, then at step 50, the phone server 10 substitutes a default caller ID for the actual caller ID of the salesperson 16a. If, at step 49, a match is found, then at step 52, the phone server 10 consults the second table 32 in the data store 12 to match an entered sales group 33 associated with the salesperson 16a and an NPA 20 of the client 18. If, at step 53, no match is found, then at step 54, the phone server 10 substitutes a default caller ID for the actual caller ID of the salesperson 16a. If, at step 53, a match is found, then at step 50, the phone server 10 substitutes a replacement caller ID (NPA 34 plus DID 36) in the second table 32 for the actual caller ID of the salesperson 16a corresponding to the matched sales group entry 28 and the NPA 20 of the client 18. At step 56, the phone server 10 inserts the replacement caller ID or default caller ID into the signaling stream of the pending telephone call. At step 58, the phone server 10 sets up a connection to the client 18 via the Internet 22 and the PSTN 20. When the client 18 answers the call, the replacement caller ID or default caller ID is displayed on the phone of the client 18.

Figure 4:
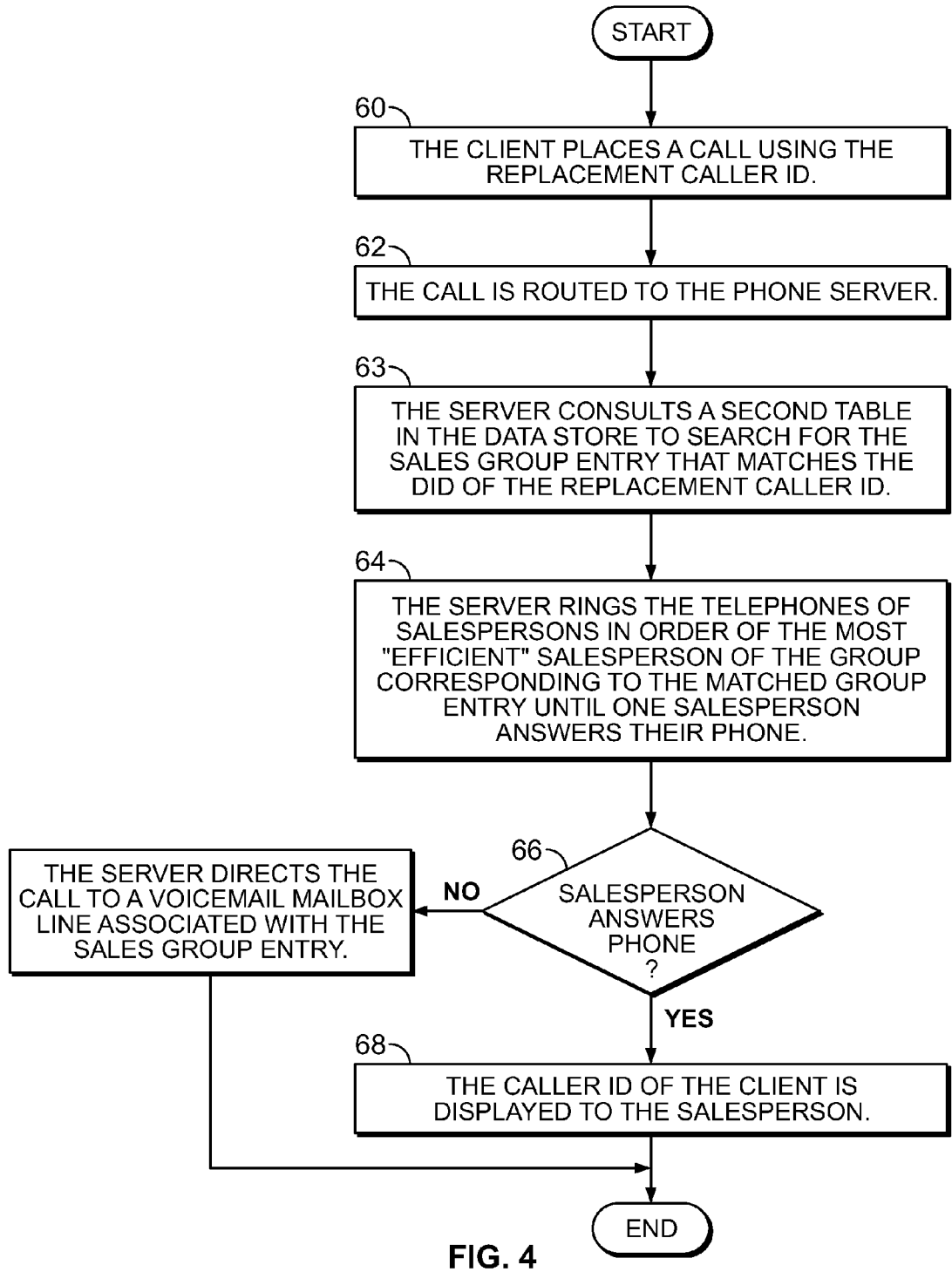
FIG. 4 is a process flow diagram illustrating exemplary steps for automatic assignment of inbound call identity between a client and a salesperson, according to an embodiment of the present invention.

FIG. 4 is a process flow diagram illustrating exemplary steps for automatic assignment of inbound call identity between a client and a salesperson, according to an embodiment of the present invention. Referring now to FIGS. 1, 2B, and 4, at step 60, the client 18 places a call using the replacement caller ID. At step 62, the PSTN 20 and the Internet 22 route the call to the phone server 10. According to an embodiment of the present invention, the PSTN 20 via the Internet 22 rings a telephone number assigned to the phone server 10. At step 63, the phone server 10 consults the second table 32 in the data store 12. The second table 32 is searched for the sales group entry 28 that matches the DID 22 of the replacement caller ID. At step 64, the server 10 rings the telephone of one of the salespeople 16n that that matches sales group entry 28 in order of the most "efficient" salesperson of the group corresponding to the matched group entry 28. If the salesperson 16n does not answer within a predetermined number of rings, or their phone line is busy, then the phone server 10 continues to ring phones of salespeople 16a-16n in a predetermined order, i.e., from highest to lowest order of listing for the matched group entry 28 in the second table 32 (i.e., highest to lowest efficiency) until one of the salespersons 16a-16n answers her telephone. If, at step 66, no salesperson 16a-16n belonging to the matched group entry 28 answers her phone, then at step 68, the server 10 directs the call to a voicemail mailbox line associated with the sales group entry 28. If, at step 66, a salesperson 16a-16n associated with the sales group entry 28 answers her phone, then at step 70, the Caller ID of the client 18 is displayed to the salesperson 16a-16n and the method terminates.

Figure 5A:
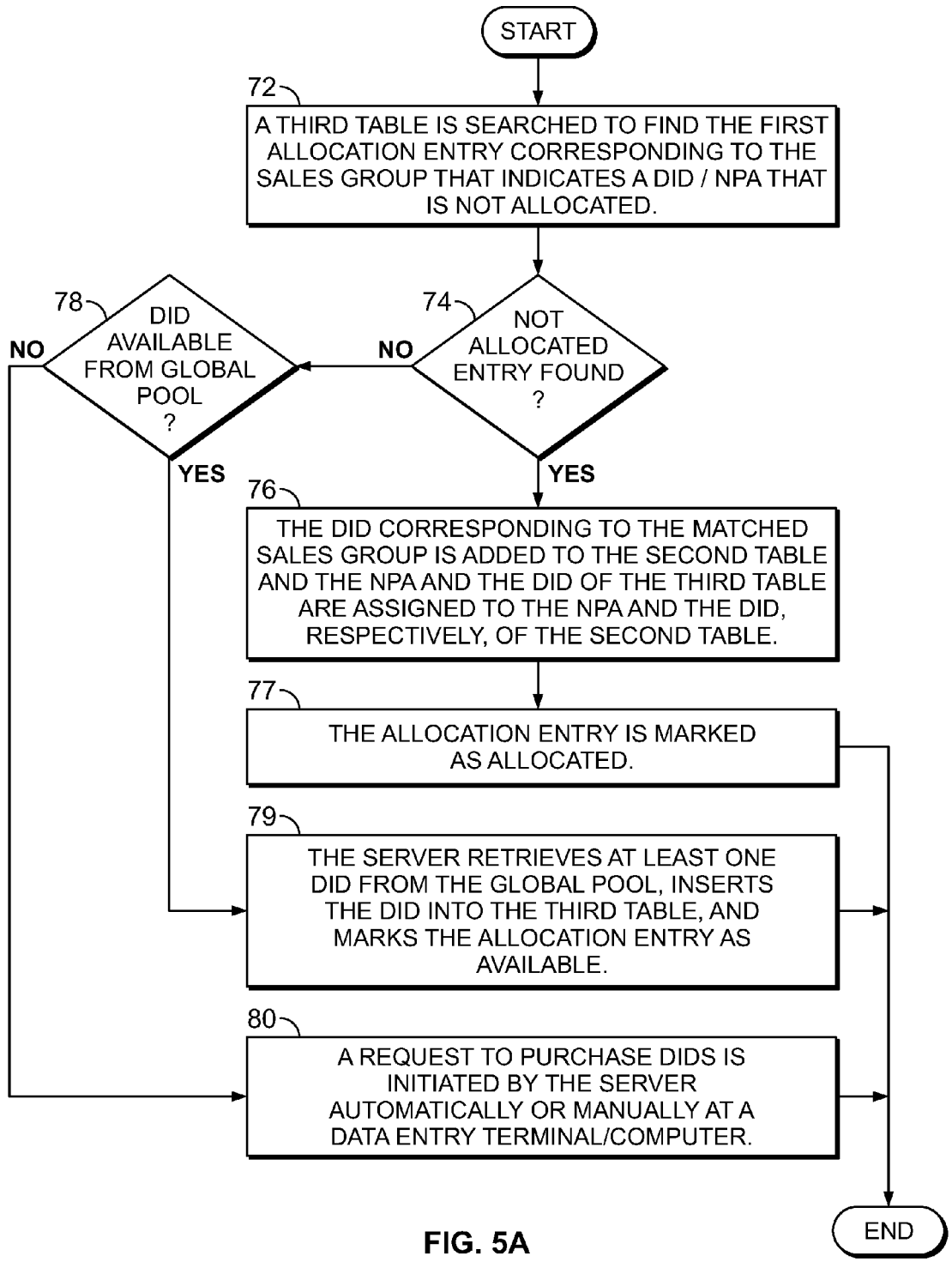
FIG. 5A is a process flow diagram illustrating exemplary steps for growing the number of available DIDs corresponding to salespeople based on sales leads, according to an embodiment of the present invention.
Figure 5B:
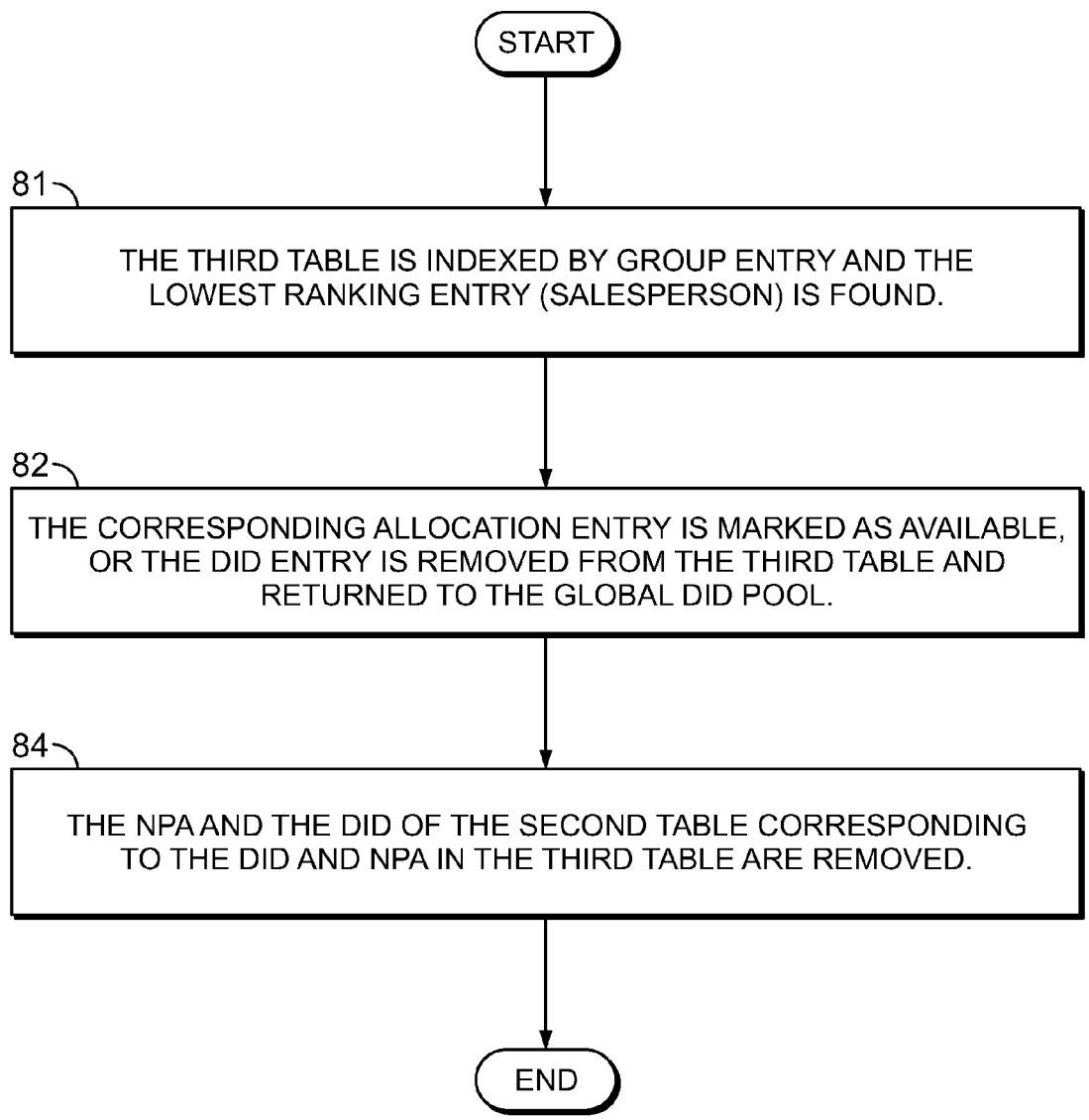
FIG. 5B is a process flow diagram illustrating exemplary steps for shrinking the number of available DIDs corresponding to salespeople based on sales leads, according to an embodiment of the present invention.

FIGS. 5A and 5B are process flow diagrams illustrating exemplary steps for growing and shrinking, respectively, the number of available DIDs corresponding to salespeople based on sales leads, according to an embodiment of the present invention. Optionally, during the execution of the steps corresponding to FIG. 5, the server 10 may keep track of sales leads. Referring now to FIGS. 1, 2B, 2C, and 5A, based on the number of sales leads per group, the number of DIDs in the second table 32 may need to grow or shrink. Assuming the number of sales leads indicate that the second table requires more entries, then one or more salesperson entries 30 corresponding to a sales group entry 28, or even an entire new sales group needs to be added to the second table 32 based on entries in the third table 38. Assuming one salesperson entry 30 is to be added to a sales group entry 28 in the second table 32, at step 72, the third table 38 is searched to find the first allocation entry 44 corresponding to the sales group 40 that indicates a DID entry 42/NPA entry 43 that is not allocated. The sales group entry 40 is derived by the server 10 from sales lead information located in the data store 12. If, at step 74, an unallocated allocation entry 44 for the sales group 40 is found, then at step 76, the DID entry 42 corresponding to the matched sales group entry 40 is added to the second table 32 and the NPA entry 43 and the DID entry 42 are assigned to the NPA entry 34 and the DID entry 36, respectively, of the second table 32. At step 77, the allocation entry 44 is marked as allocated. If, at step 74, all DID entries 42 corresponding to the sales group entry 40 are indicated as allocated, then at step 78, the server 10 determines if one or more new DIDs are available from an optional global pool of allocatable DIDs stored in the data store 12. If, at step 78, at least one DID is available, then at step 79, the phone server 10 retrieves the DID from the global pool, inserts the DID into the third table 38, and marks the allocation entry 44 as available. If, at step 79, there are no available DIDs in the optional global pool of allocatable DIDs, then at step 80, in certain embodiments, a request to purchase DIDs is initiated automatically by the phone server 10 or manually by data entry personnel at the data entry terminal/computer 14.

Referring now to FIGS. 1, 2B, 2C, and 5B, conversely, if the number of sales leads indicates that sales are shrinking, then at step 81, the third table 38 is indexed by group entry 40 and the lowest ranking entry (salesperson) is found. At step 82, in some embodiments, the corresponding allocation entry 44 is marked as available, while in other embodiments, the DID entry 42 is removed from the third table 38 and returned to the global DID pool. At step 84, the NPA entry 34 and the DID entry 36 of the second table 32 corresponding to the NPA entry 43 and DID entry 42, respectively, in the third table 38 are removed.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for automatic assignment of outbound call identity between a salesperson and a client, comprising:
    (a) maintaining a first relationship including a plurality of sales groups and a plurality of salespersons, wherein each sales group has a plurality of salespersons associated therewith;
    (b) maintaining a second relationship of a plurality of the sales groups in the first relationship and a plurality of caller ID's wherein each caller ID includes an area code (NPA) and a first direct inward dial number (DID), each sales group having a plurality of caller ID's having different NPA's;
(c) receiving a telephone number of a client from a salesperson having an actual caller ID;
(d) matching a sales group to the salesperson using the first relationship;
(e) matching the sales group from the first relationship with a sales group in the second relationship when a match is found in (d);
(f) matching an NPA of the telephone number of the client with an NPA in the second relationship corresponding to the sales group, the NPA in the second sales group being part of a replacement caller ID;
(g) substituting the replacement caller ID for the actual caller ID of the salesperson when a match is found in (f);
(h) setting up a connection to a phone of the client such that the replacement caller ID is displayed on the phone of the client;
(i) receiving the replacement caller ID of the salesperson from the client, the replacement caller ID having a second DID;
(j) searching the second relationship for a sales group that matches the second DID; and
(k) completing a call to a salesperson that matches the sales group that matches the second DID that is designated as the most efficient salesperson in the sales group that matches the second DID according to an efficiency standard based on sales efficacy.

2. The method of claim 1, further comprising substituting a default caller ID for the actual caller ID of the salesperson if a match is not found in at least one (d) and (e).

3. The method of claim 2, further comprising inserting the default caller ID into a signaling stream of a pending telephone call.

4. The method of claim 3, further comprising sending one of the default caller ID to the phone of the client.

5. The method of claim 1, further comprising:
(l) repeating step (k) for telephone numbers of salespeople in the sales group in the order of most efficient to least efficient salesperson in the sales group until a salesperson answers her telephone.

6. The method of claim 5, further comprising completing the call to a voicemail mailbox line associated with the sales group when no salesperson in the sales group answers her telephone.

7. The method of claim 5, further comprising sending the Caller ID of the client to the salesperson that answered her telephone.

8. An apparatus for automatic assignment of outbound call identity between a salesperson and a client, comprising:
a data store for storing at least one table relating sales groups to salespeople and sales groups to area codes (NPAs) of clients; and
a phone server configured for:

(a) maintaining a first relationship including a plurality of sales groups and a plurality of salespersons, wherein each sales group has a plurality of salespersons associated therewith;
(b) maintaining a second relationship of a plurality of the sales groups in the first relationship and a plurality of caller ID's wherein each caller ID includes an area code (NPA) and a first direct inward dial number (DID), each sales group having a plurality of caller ID's having different NPA's;
(c) receiving a telephone number of a client from a salesperson having an actual caller ID;
(d) matching a sales group to the salesperson using the first relationship;
(e) matching the sales group from the first relationship with a sales group in the second relationship when a match is found in (d);
(f) matching an NPA of the telephone number of the client with an NPA in the second relationship corresponding to the sales group, the NPA in the second sales group being part of a replacement caller ID;
(g) substituting the replacement caller ID for the actual caller ID of the salesperson when a match is found in (f);
(h) setting up a connection to a phone of the client such that the replacement caller ID is displayed on the phone of the client;
(i) receiving the replacement caller ID of the salesperson from the client, the replacement caller ID having a second DID;
(j) searching the second relationship for a sales group that matches the second DID; and
(k) completing a call to a salesperson that matches the sales group that matches the DID that is designated as the most efficient salesperson in the sales group that matches the second DID according to an efficiency standard based on sales efficacy.

9. The apparatus of claim 8, wherein the phone server is further configured for substituting a default caller ID for the actual caller ID of the salesperson if a match is not found in at least one of (d) and (e).

10. The apparatus of claim 8, wherein the phone server is further configured for inserting the default caller ID into a signaling stream of a pending telephone call.

11. The method of claim 1, further comprising:
(i) maintaining a third relationship of caller ID's and allocation indicators, each allocation indicator indicating whether a respective caller ID has or has not been allocated;
(j) either allocating or removing a respective caller ID from the third relationship to or from a group in the second relationship; and
(k) updating the allocation indicator in the third relationship based on the allocation or removal in (j).

12. The method of claim 11, further comprising:
determining a lead volume wherein (j) is executed in response to the determination of the lead volume.

* * * * *